US009660748B2

(12) United States Patent
Garcia

(10) Patent No.: US 9,660,748 B2
(45) Date of Patent: May 23, 2017

(54) ALGORITHM FOR PHYSICAL CELL IDENTIFIER ALLOCATION

(71) Applicant: Nokia Solutions and Networks Oy, Espoo (FI)

(72) Inventor: Ian Dexter Garcia, Palatine, IL (US)

(73) Assignee: Nokia Solutions and Networks Oy, Espoo (FI)

(*) Notice: Subject to any disclaimer, the term of this patent is extended or adjusted under 35 U.S.C. 154(b) by 66 days.

(21) Appl. No.: 14/649,236

(22) PCT Filed: Dec. 4, 2012

(86) PCT No.: PCT/EP2012/074346
§ 371 (c)(1),
(2) Date: Jun. 3, 2015

(87) PCT Pub. No.: WO2014/086394
PCT Pub. Date: Jun. 12, 2014

(65) Prior Publication Data
US 2015/0319624 A1 Nov. 5, 2015

(51) Int. Cl.
*H04J 11/00* (2006.01)
*H04W 8/26* (2009.01)
(Continued)

(52) U.S. Cl.
CPC ....... *H04J 11/0069* (2013.01); *H04J 11/0076* (2013.01); *H04W 8/26* (2013.01);
(Continued)

(58) Field of Classification Search
CPC .......... H04W 8/26–8/28; H04W 76/021; H04J 11/0069–11/0093
See application file for complete search history.

(56) References Cited

U.S. PATENT DOCUMENTS

2010/0331025 A1 12/2010 Kallin et al. .................. 455/500
2011/0274097 A1 11/2011 Zhang et al. .................. 370/338
(Continued)

FOREIGN PATENT DOCUMENTS

JP 2010/268463 A 11/2010
WO WO-2013/077059 A 5/2013

OTHER PUBLICATIONS

Amirijoo, Mehdi, et al., "Neighbor Cell Relation List and Physical Cell Identity Self-Organization in LTE", ICC Workshops 2008, Communications Workshops, IEEE International Conference, Piscataway, New Jersey, US, May 19, 2008, 5 pgs.

*Primary Examiner* — Marcus R Smith
(74) *Attorney, Agent, or Firm* — Harrington & Smith

(57) ABSTRACT

Methods, apparatus, and computer programs for automatically allocating physical layer cell identifiers A modulo 3 grouping and a modulo 30 grouping are provided for physical layer cell identifiers in a cellular communication system. The modulo 3 grouping is associated with first synchronization signal assignments and the modulo 30 grouping is associated with second synchronization signal assignments. A combination of first and second synchronization signals determines a physical layer cell identifier of a cell. A modulo 3 group is allocated to each of multiple cells of the system. After the allocation of the modulo 3 groups, a modulo 30 group is allocated to each of the multiple cells. The allocation of the modulo 30 groups incorporates the allocated modulo 3 group as a precondition for the modulo 30 grouping. To each cell, first and second synchronization signals are allocated on the basis of said allocation of the modulo 30 group.

20 Claims, 3 Drawing Sheets

(51) Int. Cl.
*H04W 56/00* (2009.01)
*H04W 24/02* (2009.01)
H04W 76/02 (2009.01)
H04W 16/18 (2009.01)

(52) U.S. Cl.
CPC ......... *H04W 24/02* (2013.01); *H04W 56/001* (2013.01); *H04W 16/18* (2013.01); *H04W 76/021* (2013.01)

(56) References Cited

U.S. PATENT DOCUMENTS

| | | | |
|---|---|---|---|
| 2012/0099565 A1* | 4/2012 | Kim | H04J 11/0079 370/336 |
| 2012/0231790 A1* | 9/2012 | Lindoff | H04W 48/16 455/434 |
| 2012/0231805 A1* | 9/2012 | Wang | H04J 11/0073 455/452.1 |
| 2015/0304932 A1* | 10/2015 | Wei | H04J 11/0069 370/331 |

* cited by examiner

US 9,660,748 B2

ALGORITHM FOR PHYSICAL CELL IDENTIFIER ALLOCATION

FIELD

The invention relates to the field of cellular communications and, particularly, to allocating physical cell identifiers to cells in a cellular communication system.

BACKGROUND

In Long-Term Evolution (LTE) of Universal Mobile Telecommunication System (UMTS), a physical cell identifier (PCI) consists of a combination of a primary synchronization sequence (PSS) and a secondary synchronization sequence (SSS). The PCIs are divided into modulo 3 groups (PCI mod 3) and modulo 30 groups (PCI mod 30), and the PCI and associated PSS and SSS should be assigned to a cell on the basis of an optimized selection of a PCI mod 3 group and PCI mod 30 group such that reference signal collisions and synchronization signal collisions between neighbouring cells are avoided.

BRIEF DESCRIPTION

The invention is defined by the independent claims.

Embodiments of the invention are defined in the dependent claims.

LIST OF DRAWINGS

Embodiments of the present invention are described below, by way of example only, with reference to the accompanying drawings, in which FIG. 1 illustrates a cellular communication system to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
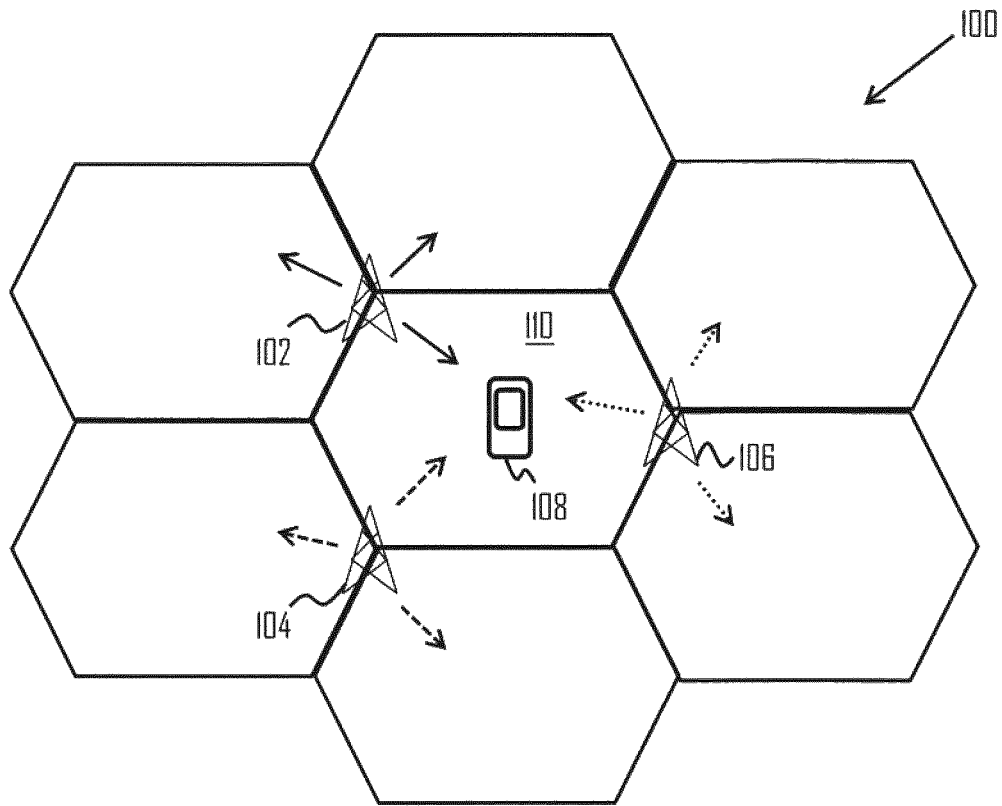

FIG. 1 illustrates a layout of a cellular communication system to which embodiments of the invention may be applied. The cellular communication system may be based on specifications of Long-Term Evolution (LTE) of Universal Mobile Telecommunication System (UMTS), although the principles of the invention may be equally applied to other wireless communication systems. As shown in FIG. 1, cell planning of a cellular network 100 may be based on three-sector base station sites, such as eNBs 102, 104, 106. This means that each site 102, 104 and 106 provides three cells directed to different directions, as shown in FIG. 1 with solid, dashed and dotted arrows, respectively. However, the network 100 may also comprise two-sector sites, omni-directional (single sector) sites, and sites with more than three sectors (although not shown). The invention is applicable to all these scenarios, although the following description focuses on the single-sector sites and three-sector sites.

Each of the three sectors (e.g. cells, each represented with a hexagonal block in FIG. 1) may have a physical-layer cell identifier (PCI) that is unique within the site and within the neighbouring sites. The determination of the PCI for a cell may be based on two aspects: acquiring a physical-layer cell identity group number $N_{ID1}$ $\{0, 1, \ldots, 167\}$ and acquiring a physical-layer cell identity number $N_{ID2}$ $\{0,1,2\}$. The PCI may then be determined on the basis of the $N_{ID1}$ and the $N_{ID2}$ as follows:

$$PCI=(3 \times N_{ID1})+N_{ID2} \qquad (1)$$

which implies 504 possible values. Assuming $N_{ID1}=2$ and the $N_{ID2}=1$ then the PCI for the cell is PCI=3*2+1=7.

The PCI may define explicitly a first synchronization sequence and a second synchronization sequence assigned to the cell and broadcasted by the base station in that cell. The first synchronization sequence may be a primary synchronization sequence (PSS), and the second synchronization sequence may be a secondary synchronization sequence (SSS). The $N_{ID1}$ may define the SSS, whereas the NID2 may define the PSS, corresponding to $1^{st}$, $2^{nd}$, and $3^{rd}$ PSS groups on the basis of PCI modulo-3 (PCI mod 3) arithmetic. Members of the same PCI mod 3 group have the same PCI mod 3 value, i.e. either 0, 1, or 2. Consequently, according the specification of the LTE, cells with the same PCI mod 3 in a single frequency layer network 100 have the same PSS sequence. Further, the cells with the same PCI mod 3 may have the same time-frequency allocation of the cell-specific reference signals (CRS).

In addition, a PCI modulo 30 (PCI mod 30) grouping may be determined. This may be beneficial so that uplink reference signal collisions, such as collisions of physical uplink control channel (PUCCH) demodulation reference signals (DMRS) may be avoided, as will be explained later. Members of the same PCI mod 30 have the same PCI mod 30 value, i.e. one of $\{0, 1, \ldots, 29\}$. The modulo 3 and modulo 30 groupings may then be used when assigning the physical-layer cell identity group number $N_{ID1}$ defining the SSS and a physical-layer cell identity number $N_{ID2}$ defining the identity within the physical layer cell identity group and the PSS.

Cell synchronization may be the very first step when user equipment 108 wants to camp on a given cell. The user equipment 108 may be e.g. a user terminal (UT), a computer (PC), a laptop, a tabloid computer, a cellular phone, a mobile phone, a communicator, a smart phone, a palm computer, or any other communication apparatus capable of operating as a terminal device in the cellular communication system. From the synchronization, the UE 108 acquires the PCI, time slot and frame synchronization, which may enable the UE 108 to obtain system information blocks (SIB) from the network 100. During the synchronization, the UE 108 may first attempt detection of the PSS. From the PSS, the UE 108 may obtain the NID2, e.g. a value from a group $\{0, 1, 2\}$). In the next step, the UE 108 may attempt the detection of the SSS symbols. From the SSS, the UE 108 may be able to obtain the NID1 (e.g. a value from a group {0, 1, ..., 167}). Using the NID1 and the NID2, the UE 108 may acquire knowledge of the PCI for the given cell, e.g. by computing Equation (1). Once the UE knows the PCI for the given cell, it may also know the location of the cell-specific reference signals (CRS) used in channel estimation, cell (re)selection and handover procedures.

From the above, it is clear that allocating the PCIs (e.g. allocating the NID1 and the NID2 for the cells) is important from the point of view of the performance of the network 100. For example, looking at FIG. 1, it may be seen that the UE 108 locates in the area 110 covered by each of the eNB 102, 104, 106. In other words, three cells, each from a different eNB 102, 104, 106, overlap in the area 110 where the UE 108 is located. Let us further assume that at least some of the overlapping cells in the area 110 have at least partly the same PCIs. As a result, during synchronization in the network 100, correlation of the PSSs and/or the SSSs (i.e. overlap of NID1 and/or NID2) from different eNBs 102, 104, 106 may cause significant degradation in the detection of the eNBs 102, 104, 106. This may lead to poor key performance indicators (KPIs), especially for UEs at the cell-edge.

A conventional approach to avoid such CRS/PSS/SSS/DMRS collisions for three-sector site deployments is to assign different PCI mod 3 (i.e. different NID2) to cells of the same site, as explained above. For single-sector deployments, the conventional approach to avoid collisions is by visual inspection or minimizing the amount of interference above a threshold. However, the collisions are not optimally avoided and improvements in the PCI assignment are needed.

Figure 2:
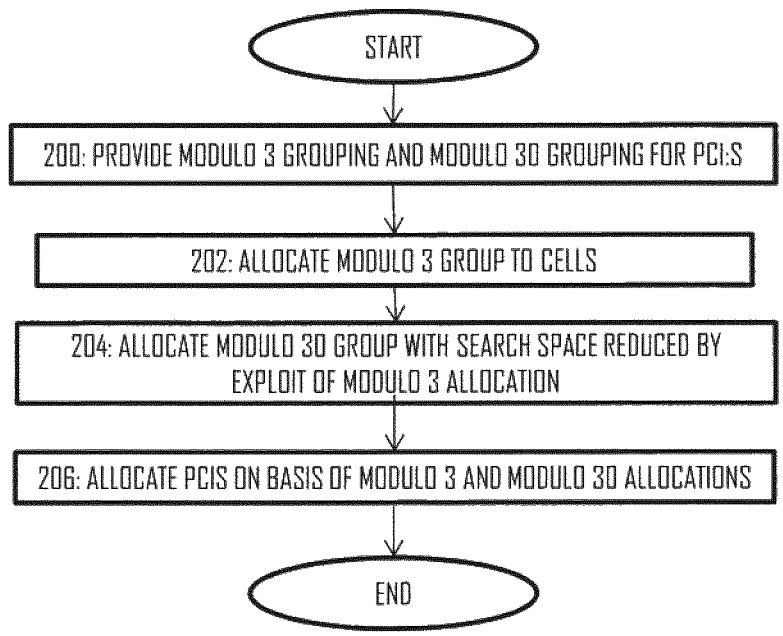
FIG. 2 illustrates a flow diagram of a process for assigning modulo 3 and modulo 30 groups to cells of the cellular communication system according to an embodiment of the invention.

FIG. 2 illustrates a procedure for assigning the modulo 3 and modulo 30 groupings that are used when assigning the physical-layer cell identity group number $N_{ID1}$ and the physical-layer cell identity number $N_{ID2}$. The procedure employs a sequential approach in which one grouping is made first and, then a search space for the other grouping is reduced by employing the results of the grouping already made. Accordingly, computational complexity in an apparatus carrying out the groupings and the assignment of the PCI may be reduced. Let us now refer to FIG. 2 illustrating a flow diagram of the procedure for automatically allocating physical layer cell identifiers to cells of a cellular communication system. In block 200, a modulo 3 grouping and a modulo 30 grouping for physical layer cell identifiers are provided. The modulo 3 grouping is associated with first synchronization signal assignments and the modulo 30 grouping is associated with second synchronization signal assignments. As mentioned above, a combination of a first synchronization signal and a second synchronization signal determines the physical layer cell identifier of a cell. In block 202, a modulo 3 group is allocated to each of a plurality of cells of the cellular communication system. After the allocation of the modulo 3 groups, a modulo 30 group is allocated to each of the plurality of cells in block 204. The allocation of the modulo 30 groups is made from a reduced search space by incorporating the already allocated modulo 3 group as a precondition for the modulo 30 grouping. Thus, the search space may be reduced from 30 candidate modulo 30 groups to less than 30 candidate modulo 30 groups, e.g. to ten candidate modulo 30 groups.

In block 206, a first synchronization signal a second synchronization signal are allocated to each cell on the basis of said allocations of the modulo 3 group and modulo 30 group.

The reduction in the search space for the modulo 30 grouping may be achieved, because the search space of ten or more modulo 30 groups is sufficient to meet the requirement of eliminating the DMRS collisions. Accordingly, a search space of 30 modulo 30 groups causes computation overhead that is not necessary.

An advantage provided by this embodiment is that the PCIs and the modulo 3 and modulo 30 groups may be allocated reliably with low computational complexity and low-to-none interference/collisions between cells. This provides a network operator with a reliable and low-complexity solution system for allocating the PCIs to cells of a cellular communication network.

Figure 3:
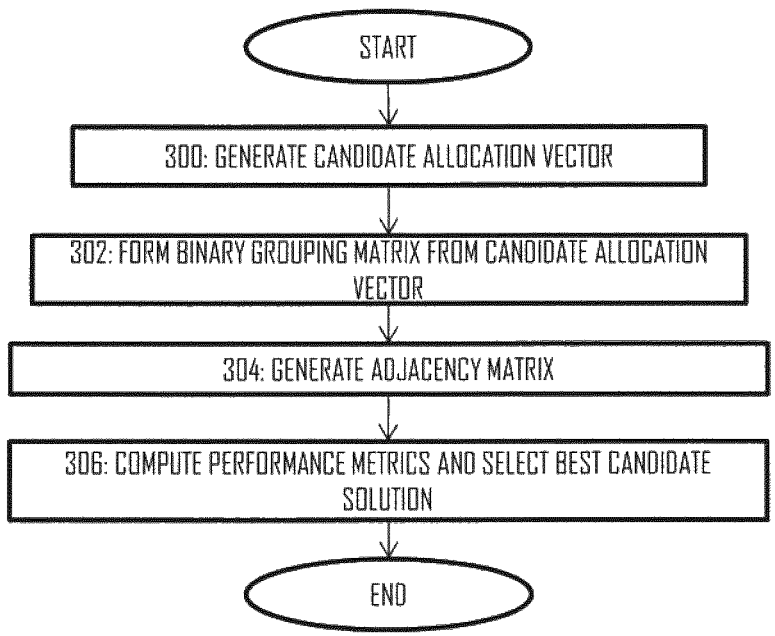
FIG. 3 illustrates a procedure for allocating modulo 3 groups according to an embodiment of the invention.

Let us now consider some embodiment of the generic procedure of FIG. 2. FIG. 3 illustrates a flow diagram of an embodiment of the allocation of the modulo 3 groups (block 202). Referring to FIG. 3, first a plurality of candidate solutions are generated, each candidate solution comprising a candidate allocation vector for the modulo 3 grouping for a plurality of cells (block 300). Each element of the candidate allocation vector represents a candidate allocation of the modulo 3 group for a cell, so the candidate allocation vector represents a candidate allocation of the modulo 3 groups for the cells to which the PCI is being assigned. In block 302, a binary grouping matrix is generated from the elements of the candidate allocation vector according to a determined criterion. An embodiment of the criterion is described below. Then, an adjacency matrix representing a layout of the cells in the cellular communication system is generated in block 304. The adjacency matrix may be constructed by measuring interference levels between the cell sites, e.g. signal-to-interference (SIR), signal-to-interference-plus-noise (SINR), received signal strength indicators (RSSI) or other metrics that represent the locations of the cell sites in the cellular communication system, how neighbouring cells are observed in a cell site, etc. The elements of the adjacency matrix may have any values that represent the distances (e.g. geographical distance or radio distance) between the cell sites. In block 306, a metric representing inter-cell interference caused by said allocations of each candidate solution is computed for each candidate solution. A candidate solution resulting in a metric that exhibits the lowest interference or best performance may be selected, and the corresponding modulo 3 groupings may be applied to the cells.

Let us now consider a mathematical approach for allocating the modulo 3 groups. Below, two separate cases are considered: one with an initial condition to reduce the search space for the modulo 3 grouping and one without such an initial condition. Let us first consider the case with the initial condition, wherein the initial condition sets a requirement to force a different PSS for three cells of the same cell site or the same SSS for the three cells of the same cell site. This case is thus applicable to 3-cell sites. Accordingly, $n^{th}$ site of the $p^{th}$ candidate solution is assigned an optimization variable with six elements as $\gamma_{p,n}^{PSS} = \{1, 2, \ldots, 6\}$ which comprises a set of possible PSS assignments for the cells of the same cell site n. In other words, each element represent a possible combination of the PSS allocations for the cells of the same cell site, as represented by the following PSS mapping matrix:

$$M_{PSS} = \begin{bmatrix} 1 & 0 & 2 \\ 2 & 1 & 0 \\ 0 & 2 & 1 \\ 1 & 2 & 0 \\ 2 & 0 & 1 \\ 0 & 1 & 2 \end{bmatrix}$$

It should be appreciated that the order of rows in the PSS mapping matrix are arbitrary, and the rows may be interchanged to achieve the same result. Each element of the PSS mapping matrix represents a modulo 3 group index.

The candidate allocation vector may be formed from the elements of the PSS mapping matrix and the optimization variable $\gamma_{p,n}^{PSS}$ as follows:

$$c_p^{PSS} = \left[ M_{PSS,\gamma_{p,1}^{PSS},1} \; M_{PSS,\gamma_{p,1}^{PSS},2} \; M_{PSS,\gamma_{p,1}^{PSS},3} \; M_{PSS,\gamma_{p,2}^{PSS},1} \; \ldots \; M_{PSS,\gamma_{p,N_{site}}^{PSS},3} \right],$$

wherein $N_{site}$ represents the number of cell sites. The candidate allocation vector thus selects rows of the PSS mapping matrix for each cell site and sorts the groups-of-three consecutively into the vector form. Different candidate solutions p make different kinds of selections and result in different candidate allocation vectors. In a simplified solution where the number of cell sites is three and first three rows of the PSS mapping matrix are selected, one for each cell site, the candidate allocation vector thus gets the following form:

$$c_p^{PSS} = [1 \; 0 \; 2 \; 2 \; 1 \; 0 \; 0 \; 2 \; 1]$$

Then, the binary grouping matrix may be formed from the candidate allocation vector. The binary grouping matrix may be constructed by applying the following criterion:

$$G_{p,i,n}^{PSS} = \begin{cases} 1, & \text{if } n = c_{p,i}^{PSS} + 1 \\ 0, & \text{otherwise} \end{cases},$$

wherein $G_{p,i,n}^{PSS}$ represents the binary grouping matrix, and i and n are indices of elements of the binary grouping matrix (i for rows, n for columns) and the candidate allocation vector. If we consider the simplified example of the candidate allocation vector for the three cell sites, the corresponding binary grouping matrix will get the following form:

$$G_{p,i,n}^{PSS} = \begin{bmatrix} 0 & 1 & 0 \\ 1 & 0 & 0 \\ 0 & 0 & 1 \\ 0 & 0 & 1 \\ 0 & 1 & 0 \\ 1 & 0 & 0 \\ 1 & 0 & 0 \\ 0 & 0 & 1 \\ 0 & 1 & 0 \end{bmatrix}$$

The adjacency matrix A may have the same dimensions as the binary grouping matrix, and it may represent the layout and inter-relations between the different cells and cell sites. An optimization problem for deriving the performance of each candidate solution may be represented as:

$$\min \text{Trace}(\{G_p^{PSS}(\gamma_p^{PSS})\}^T A G_p^{PSS}(\gamma_p^{PSS}))$$

wherein T represents a transpose of a matrix. A trace is used as the metric representing the performance of the candidate allocation in this embodiment. The trace is the sum of the elements on the main diagonal of a matrix, and it is computationally simple. Other metrics may, however, be derived depending on the problem formulation. The candidate solution providing the lowest trace may be selected and a corresponding modulo 3 grouping may be applied.

In the second case with no initial conditions, $n^{th}$ cell of the $p^{th}$ candidate solution is assigned an optimization variable with three elements as $=\{1, 2, 3\}$ which comprises a set of possible PSS assignments for the cell. In this case, the candidate allocation vector may be derived directly from the optimization variable as:

$$c_p^{PSS} = [\gamma_{p,1}^{PSS} - 1 \; \gamma_{p,2}^{PSS} - 1 \; \ldots \; \gamma_{p,N_{cell}}^{PSS} - 1]$$

where $N_{cell}$ is the number of cells to which the PCIs are being assigned. "−1" in each element simply offsets the values from range $\{1, 2, 3\}$ to $\{0, 1, 2\}$ to comply with the values of the candidate allocation vector of the first case described above. Then, the binary grouping matrix may be constructed, the optimization problem formed, and the performance metric (the trace) computed in the above-described manner.

As a result, the modulo 3 groups are assigned to each cell under consideration.

Figure 4:
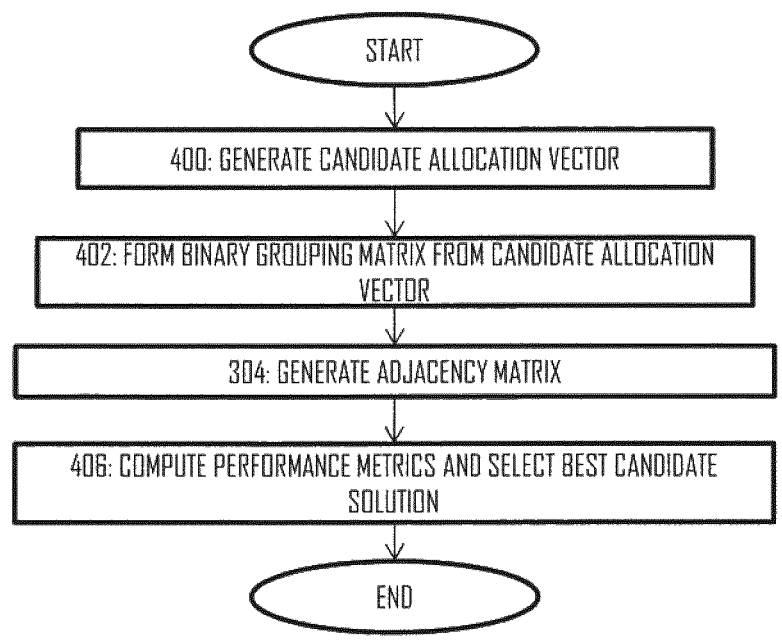
FIG. 4 illustrates a procedure for allocating modulo 30 groups according to an embodiment of the invention.

FIG. 4 illustrates a flow diagram of an embodiment of the allocation of the modulo 30 groups (block 204). Referring to FIG. 4, first a plurality of candidate solutions are generated in block 400, each candidate solution comprising a candidate allocation vector for the modulo 30 grouping for a plurality of cells, wherein each element of the candidate allocation vector represents a candidate allocation of the modulo 30 group for a cell. In block 402, a binary grouping matrix is formed from the elements of the candidate allocation vector according to a determined criterion. An example of the criterion is provided below. In block 304, said adjacency matrix representing the layout of the cells in the cellular communication system is generated. In practice, the same adjacency matrix used in block 304 and the embodiments described above may be used. In block 406, a metric representing inter-cell interference caused by said allocations of each candidate solution is computed and a candidate solution providing the lowest inter-cell interference is selected. Modulo 30 groups of the selected candidate solution may then be allocated to the cells, and SSSs may be assigned to the cells from the allocated modulo 30 groups.

Let us now consider a corresponding mathematical approach for allocating the modulo 30 groups. Again, two separate cases are considered: one with an initial condition to reduce the search space for the modulo 30 grouping and one without such an initial condition. Let us first consider the case with the initial condition, wherein the initial condition sets a requirement to force the same SSS for the cells of the same cell site. This case may be applied to sites comprising more than one cell. However, to maintain compliance with the above-described embodiments, let us consider a case with three-cell sites. The $n^{th}$ site of the $p^{th}$ candidate solution is assigned an optimization variable with ten elements as $\gamma_{p,n}^{PSS} = \{0, 1, \ldots, 9\}$ which comprises a set of possible SSS assignments for all the cells of the same cell site n. The same SSS assignment is thus used' for all the cells of the same cell site n. $\gamma_{p,n}^{PSS}$ determines the set of possible PCI group identity values $N_{ID1}$ and, as a consequence, the set of SSSs allowed for the cell. For example, for $\gamma_{p,n}^{PSS} = 0$, the set of allowed PCI group identity values $N_{ID1}$ are $\{0, 10, 20, \ldots, 150\}$.

The candidate allocation vector may be formed from the optimization variable $\gamma_{p,n}^{PSS}$ as follows:

$$c_p^{SSS} = [3\gamma_{p,1}^{SSS} + c_{opt,1}^{PSS} \; 3\gamma_{p,1}^{SSS} + c_{opt,2}^{PSS} \; 3\gamma_{p,1}^{SSS} + c_{opt,3}^{PSS} \; 3\gamma_{p,2}^{SSS} + c_{opt,4}^{PSS} \ldots, 3\gamma_{p,N_{site}}^{SSS} + c_{opt,N_{cell}-2}^{PSS} \; 3\gamma_{p,N_{site}}^{SSS} + c_{opt,N_{cell}-1}^{PSS} \; 3\gamma_{p,N_{site}}^{SSS} + c_{opt,N_{cell}}^{PSS}]$$

wherein $N_{site}$ represents the number of cell sites, $N_{cell}$ represents the number of cells, and $c_{opt}^{PSS}$ represents the elements of the selected optimal candidate allocation vector for the modulo 3 grouping described above. The candidate allocation vector is thus arranged to comprise an element of the optimization variable $\gamma_{p,n}^{SSS}$ (a physical layer cell identity group number $N_{ID1}$) selected for each cell site in combination of the physical layer cell identity number $N_{ID2}$ already selected for the cell. Different candidate solutions p make different kinds of selections and result in different candidate allocation vectors. The combination of the $c_{opt}^{PSS}$ and $\gamma_{p,n}^{SSS}$ creates basically 30 possible values for each element of the $c_p^{SSS}$ as $c_p^{SSS}=\{0, 1, \ldots, 29\}$. As the modulo 3 grouping is taken into account in the modulo 30 grouping, the search space defined by the optimization variable may be limited from $\gamma_{p,n}^{SSS}=\{0, 1, \ldots, 29\}$ to $\gamma_{p,n}^{SSS}=\{0, 1, \ldots, 9\}$.

Then, the binary grouping matrix may be formed from the candidate allocation vector $c_p^{SSS}$. The binary grouping matrix may be constructed by applying the following criterion:

$$G_{p,i,n}^{SSS} = \begin{cases} 1, & \text{if } n = c_{p,i}^{SSS} + 1 \\ 0, & \text{otherwise} \end{cases},$$

wherein $G_{p,i,n}^{SSS}$ represents the binary grouping matrix, and i and n are indices of elements of the binary grouping matrix (i for rows, n for columns) and the candidate allocation vector.

The adjacency matrix A may be the same adjacency matrix used in the modulo 3 grouping, and the optimization problem for deriving the performance of each candidate solution may be similar to that described above as:

$$\min \text{Trace}(\{G_p^{SSS}(\gamma_p^{SSS})\}^T A G_p^{SSS}(\gamma_p^{SSS}))$$

Metrics other than the trace may, again, be derived depending on the problem formulation. The candidate solution providing the lowest trace may be selected and a corresponding modulo 30 grouping may be applied.

In the second case with no initial conditions, $n^{th}$ cell of the $p^{th}$ candidate solution is assigned an optimization variable with also ten elements as $\gamma_{p,n}^{SSS}=\{0, 1, \ldots, 9\}$ which comprises values associated with a set of possible SSS assignments for each cell. $\gamma_{p,n}^{SSS}$ determines the set of possible PCI group identity values $N_{ID1}$ and, as a consequence, the set of SSSs allowed for the cell. For example, for $\gamma_{p,n}^{SSS}=9$, the set of allowed PCI group identity values $N_{ID1}$ are $\{9, 19, 29, \ldots, 159\}$.

The candidate allocation vector now has a different form because of no restrictions:

$$c_p^{SSS}=[[3\gamma_{p,1}^{SSS}+c_{opt,1}^{PSS}\ 3\gamma_{p,1}^{SSS}+c_{opt,2}^{PSS}\ 3\gamma_{p,N_{cell}}^{SSS}+c_{opt,N_{cell}}^{PSS}]],$$

Instead of selecting an element of the optimization variable $\gamma_{p,n}^{SSS}$ for each cell site and using the same element for all the cells of the site, an element of the optimization variable is selected for each cell. Then, the binary grouping matrix may be constructed, the optimization problem formed, and the performance metric (the trace) computed in the above-described manner.

As a result, the modulo 30 groups are assigned to each cell under consideration.

As the modulo 30 grouping already considers the optimized modulo 3 grouping as well, the PCIs may be assigned directly from the selected optimal candidate solution $c_{opt}^{SSS}$ under the constraint that $PCI_n \mod 30\ c_{opt,n}^{SSS}$. In addition to this constraint, other constraints may be applied, e.g. neighbour cells shall not be allocated with the same PCI or neighbours of neighbours shall not be allocated with the same PCI in order to avoid identity confusions during handovers. Other criteria may include PCI blacklists, minimum reuse distance for the same PCI, etc. The minimum reuse distance may be defined with provision of a site-to-site threshold and comparing the distance between two cells with the site-to-site threshold: if the distance between two cells is above the site-to-site threshold, the same PCI may be allocated to the cells. The PCI allocation may also take into account the restrictions used in the groupings described above. If the restriction to use the different PSS or the same SSS in the cells of the same site, the PCI allocation may then be carried out such that the restrictions will be applied.

In an embodiment, a subset of the elements of any one of the candidate allocation vectors described above is fixed beforehand to further reduce the complexity of the algorithm. Some criteria for the fixing or pre-assigning may be provided, e.g. the elements representing two neighbouring cells may not both be fixed in order to leave sufficient room for the optimization and avoid poor performance caused by the fixing. In an embodiment applicable to a situation where new cells are being established amongst an existing layout of cells, the PCIs and associated modulo 3 and modulo 30 groups of the existing cells may be maintained, i.e. their respective values may be pre-assigned. The present algorithm may be used to compute optimized PCI values for the new cells under the constraint of maintaining the PCIs of the existing cells.

Let us now consider the advantages gained by using the in the above-described embodiments for reducing the search space. Table 1 below shows the computational complexities in terms of the size of the search space for a baseline solution, the embodiment using only the reduced number of candidate options for the modulo 30 grouping, the embodiment using the further restriction of using the different PSS for the cells of the same site and no constraints for SSS, and the embodiment using the further restriction of using the different PSS and the same SSS for the cells of the same site.

TABLE 1

|  | Baseline (30 candidate options for modulo 30 grouping) | No Constraints on PSS and SSS; 10 candidate options for modulo 30 grouping | Different PSS; No SSS constraint | Different PSS; same SSS |
|---|---|---|---|---|
| PCI mod 3 Allocation | $3^{N_{cell}-1}$ | $3^{N_{cell}-1}$ | $6^{N_{site}-1}$ | $6^{N_{site}-1}$ |
| PCI mod 30 Allocation | $30^{N_{cell}-1}$ | $10^{N_{cell}-1}$ | $10^{N_{cell}-1}$ | $10^{N_{site}-1}$ |

Table 2 below shows the computational complexities when using the pre-assigned PSS or SSS for a subset of cells.

TABLE 2

|  | Baseline (30 candidate options for modulo 30 grouping) | No Constraints on PSS and SSS; 10 candidate options for modulo 30 grouping) | Different PSS; No SSS constraint | Different PSS; same SSS |
|---|---|---|---|---|
| PCI mod 3 Allocation | $3^{N_{cell}-N_{cell}^{pre-assigned}}$ | $3^{N_{cell}-N_{cell}^{pre-assigned}}$ | $6^{N_{site}-N_{site}^{pre-assigned}}$ | $6^{N_{site}-N_{site}^{pre-assigned}}$ |
| PCI mod 30 Allocation | $30^{N_{cell}-N_{cell}^{pre-assigned}}$ | $10^{N_{cell}-N_{cell}^{pre-assigned}}$ | $10^{N_{cell}-N_{cell}^{pre-assigned}}$ | $10^{N_{site}-N_{site}^{pre-assigned}}$ |

Figure 5:
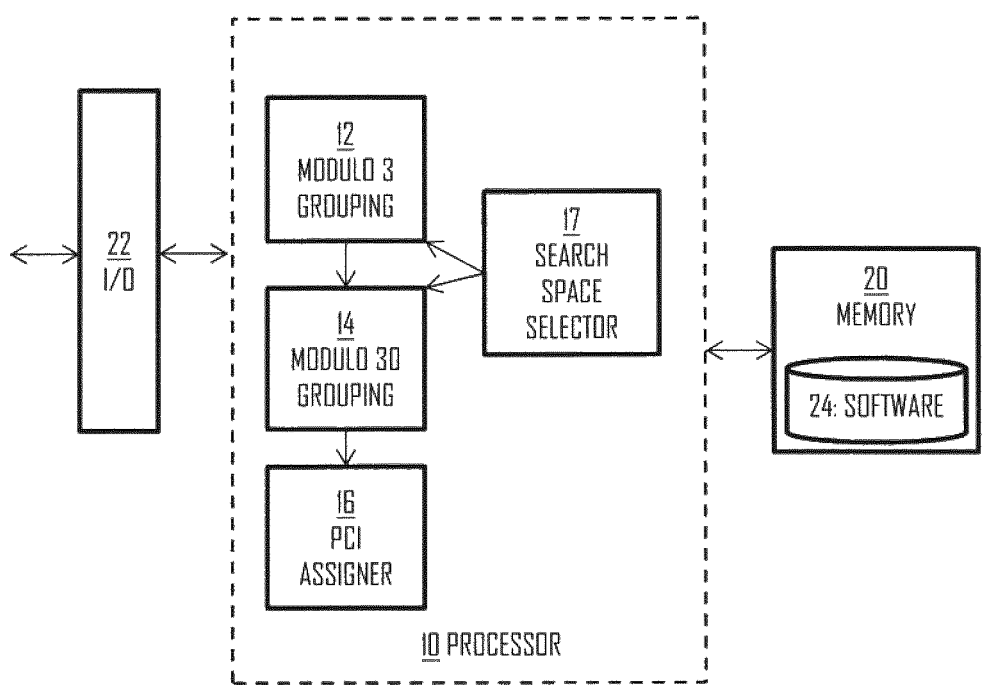
FIG. 5 illustrates a block diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out any one of the above-described procedures for assigning the $N_{ID1}$ and $N_{ID2}$ to cells of a cellular communication system. FIG. 5 illustrates a block diagram of a structure of the apparatus according to an embodiment of the invention. Referring to FIG. 5, the apparatus comprises the processor 10, the memory 20, and the computer program code 24. The procedure for allocating the modulo 3 and modulo 30 groupings may be realized by instructions of the computer program code 24 when executed by the processor 10. Upon reading the computer program code 20, the processor 10 may configure its circuitries to comprise a modulo 3 grouping circuitry 12 configured to carry out the modulo 3 grouping, a modulo 30 grouping circuitry 14 configured to carry out the modulo 30 grouping by using the modulo 3 grouping to reduce the search space, a PCI assigner 17 to assign the PCIs on the basis of the modulo 30 grouping, and a search space selector 17 to further assign further restrictions that limit the search space in the modulo 3 grouping and/or in the modulo 30 grouping. The restrictions applied by the search space selector may comprise pre-assignment of the modulo 3 and/or modulo 30 groups or PSSs and/or SSSs for a subset of cells, restrictions such as forcing the cells of the same cell site to use the same SSS or different PSSs, etc.

As shown in FIG. 5, the modulo 3 grouping circuitry 12 first carries out the modulo 3 grouping. It may receive the search space restrictions from the search space selector 17 to reduce the search space and the number of candidate solutions for the modulo 3 grouping. Upon assigning the modulo 3 groups, the modulo 3 grouping circuitry 12 outputs the modulo 3 groups to the modulo 30 grouping circuitry 14. The modulo 30 grouping circuitry 14 may receive the search space restrictions from the search space selector, and the restrictions may be the same as or different from the restrictions used by the modulo 3 grouping circuitry 12. By taking into account the modulo 3 groupings and, optionally, the further restrictions the modulo 30 grouping circuitry may reduce the search space and the number of candidate solutions and carry out the modulo 30 grouping. When the modulo 30 groups have been assigned to the cells, the PCI assigner 16 may assign the actual PCIs and the associated PSSs and SSSs to the cells in the above-described manner or according to state of the art techniques.

Upon assigning the PCIs, the processor may output the assigned Pas to the corresponding cells or base stations via an input/output (I/O) interface 22. The I/O interface 22 may be configured to provide the apparatus with a communication connection with the base stations of the cellular communication system. The connection may be based on internet protocol (IP), for example.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular or mobile telecommunication systems defined above but also to other suitable telecommunication systems. The protocols used, the specifications of systems and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:
1. A method comprising:
providing, by the apparatus, a modulo 3 grouping and a modulo 30 grouping for physical layer cell identifiers in a cellular communication system, wherein the modulo 3 grouping is associated with first synchronization signal assignments and the modulo 30 grouping is associated with second synchronization signal assignments, and wherein a combination of a first synchronization signal and a second synchronization signal determines a physical layer cell identifier of a cell;
allocating, by the apparatus, a modulo 3 group to each of a plurality of cells of the cellular communication system;
allocating, by the apparatus, and after the allocation of the modulo 3 groups, a modulo 30 group to each of the plurality of cells of the cellular communication system, wherein the allocation of the modulo 30 groups incorporates the allocated modulo 3 group as a precondition to reduce a search space for the modulo 30 grouping;
allocating, by the apparatus, to each cell a first synchronization signal and a second synchronization signal on the basis of said allocation of the modulo 30 group;
using, by the apparatus, the allocated first synchronization signal and allocated second synchronization signal to assign a unique physical layer cell identifier to each cell; and
sending, by the apparatus, the assigned unique physical cell identifiers to the cells to be used by the cells to perform at least cell synchronization with user equipment.

2. The method of claim 1, wherein the incorporation of the previously allocated modulo 3 group reduces the search space of the modulo 30 group from 30 candidate solutions to 10 candidate solutions.

3. The method of claim 1, further comprising setting an initial condition for the modulo 3 group allocation that reduces a search space used for allocating the modulo 3 group.

4. The method of a claim 1, further comprising setting an initial condition for the modulo 30 group allocation that reduces a search space used for allocating the modulo 30 group.

5. The method of claim 1, wherein said allocating the modulo 3 group comprises:
generating a plurality of candidate solutions, each candidate solution comprising a candidate allocation vector for the modulo 3 grouping for a plurality of cells, wherein each element of the candidate allocation vector represents a candidate allocation of the modulo 3 group for a cell;
forming a binary grouping matrix from the elements of the candidate allocation vector according to a determined criterion;
generating an adjacency matrix representing a layout of the cells in the cellular communication system; and
computing for each candidate solution a metric representing inter-cell interference caused by said allocations of each candidate solution;
selecting a candidate solution providing the lowest inter-cell interference and allocating to cells modulo 3 groups of the selected candidate solution.

6. The method of claim 1, wherein said allocating the modulo 30 group comprises:
generating a plurality of candidate solutions, each candidate solution comprising a candidate allocation vector for the modulo 30 grouping for a plurality of cells, wherein each element of the candidate allocation vector represents a candidate allocation of the modulo 30 group for a cell;
forming a binary grouping matrix from the elements of the candidate allocation vector according to a determined criterion;
generating said adjacency matrix representing the layout of the cells in the cellular communication system; and
computing for each candidate solution a metric representing inter-cell interference caused by said allocations of each candidate solution;
selecting a candidate solution providing the lowest inter-cell interference and allocating to cells modulo 30 groups of the selected candidate solution.

7. The method of claim 1, further comprising reducing the search space by pre-assigning a modulo 3 group and/or a modulo 30 group for a subset of the cells.

8. An apparatus comprising:
at least one processor; and
at least one memory including a computer program code, wherein the at least one memory and the computer program code are configured, with the at least one processor, to cause the apparatus to:
provide a modulo 3 grouping and a modulo 30 grouping for physical layer cell identifiers in a cellular communication system, wherein the modulo 3 grouping is associated with first synchronization signal assignments and the modulo 30 grouping is associated with second synchronization signal assignments, and wherein a combination of a first synchronization signal and a second synchronization signal determines a physical layer cell identifier of a cell;
allocate a modulo 3 group to each of a plurality of cells of the cellular communication system;
allocate, after the allocation of the modulo 3 groups, a modulo 30 group to each of the plurality of cells of the cellular communication system, wherein the allocation of the modulo 30 groups incorporates the allocated modulo 3 group as a precondition to reduce a search space for the modulo 30 grouping;
allocate to each cell a first synchronization signal and a second synchronization signal on the basis of said allocation of the modulo 30 group;
using the allocated first synchronization signal and allocated second synchronization signal to assign a unique physical layer cell identifier to each cell; and
sending the assigned unique physical cell identifiers to the cells to be used by the cells to perform at least cell synchronization with user equipment.

9. The apparatus of claim 8, wherein the at least one memory and the computer program code are configured, with the at least one processor, to cause the apparatus to reduce the search space of the modulo 30 group from 30 candidate solutions to 10 candidate solutions with the incorporation of the previously allocated modulo 3 group.

10. The apparatus of claim 8, wherein the at least one memory and the computer program code are configured, with the at least one processor, to cause the apparatus to set an initial condition for the modulo 3 group allocation that reduces a search space used for allocating the modulo 3 group.

11. The apparatus of claim 10, wherein the initial condition comprises a requirement to use a different first synchronization signal on multiple cells of a cell site or a requirement to use the same second synchronization signal on the cells of the cell site.

12. The apparatus of claim 10, wherein the at least one memory and the computer program code are configured, with the at least one processor, to cause the apparatus to set as the initial condition a requirement for cells of each 3-sector cell site to have different modulo 3 groups, thus reducing the search space to six candidate modulo 3 group combinations per cell site.

13. The apparatus of claim 8, wherein the at least one memory and the computer program code are configured, with the at least one processor, to cause the apparatus to set an initial condition for the modulo 30 group allocation that reduces a search space used for allocating the modulo 30 group.

14. The apparatus of claim 13, wherein the initial condition comprises a requirement to use the same second synchronization signal on the cells of a three-sector cell site, thus reducing the search space to ten candidate solutions per cell site.

15. The apparatus of claim 8, wherein the at least one memory and the computer program code are configured, with the at least one processor, to cause the apparatus to allocate the modulo 3 group by:
generating a plurality of candidate solutions, each candidate solution comprising a candidate allocation vector for the modulo 3 grouping for a plurality of cells, wherein each element of the candidate allocation vector represents a candidate allocation of the modulo 3 group for a cell;
forming a binary grouping matrix from the elements of the candidate allocation vector according to a determined criterion;
generating an adjacency matrix representing a layout of the cells in the cellular communication system; and
computing for each candidate solution a metric representing inter-cell interference caused by said allocations of each candidate solution;
selecting a candidate solution providing the lowest inter-cell interference and allocating to cells modulo 3 groups of the selected candidate solution.

16. The apparatus of claim 15, wherein the predetermined criterion for forming the binary grouping matrix is:

$$G_{p,i,n}^{PSS} = \begin{cases} 1, & \text{if } n = c_{p,i}^{PSS} + 1 \\ 0, & \text{otherwise} \end{cases},$$

wherein $G_{p,i,n}^{PSS}$ represents the binary grouping matrix, $c_{p,i}^{PSS}$ represents the candidate allocation vector, p is an index of the candidate solution, and i and n are indices of elements of the binary grouping matrix and the candidate allocation vector.

17. The apparatus of claim 8, wherein the at least one memory and the computer program code are configured, with the at least one processor, to cause the apparatus to allocate the modulo 30 group by:
generating a plurality of candidate solutions, each candidate solution comprising a candidate allocation vector for the modulo 30 grouping for a plurality of cells, wherein each element of the candidate allocation vector represents a candidate allocation of the modulo 30 group for a cell;
forming a binary grouping matrix from the elements of the candidate allocation vector according to a determined criterion;
generating said adjacency matrix representing the layout of the cells in the cellular communication system; and
computing for each candidate solution a metric representing inter-cell interference caused by said allocations of each candidate solution;
selecting a candidate solution providing the lowest inter-cell interference and allocating to cells modulo 30 groups of the selected candidate solution.

18. The apparatus of claim 17, wherein each element of the candidate allocation vector represents a candidate allocation of a modulo 30 group for a cell and comprises a combination of a modulo 3 group selected for the cell and a candidate second synchronization sequence group assignment for the cell.

19. The apparatus of claim 18, wherein the combination is $3\gamma_{p,i}^{SSS} + c_{p,i}^{PSS}$, wherein $\gamma_{p,i}^{SSS}$ represents the candidate second synchronization sequence group assignment for the cell i and $c_{p,i}^{PSS}$ represents an $i^{th}$ element of the selected candidate allocation vector of the modulo 3 grouping.

20. The apparatus of claim 17, wherein the predetermined criterion for forming the binary grouping matrix is:

$$G_{p,i,n}^{SSS} = \begin{cases} 1, & \text{if } n = c_{p,i}^{SSS} + 1 \\ 0, & \text{otherwise} \end{cases},$$

wherein $G_{p,i,n}^{SSS}$ represents the binary grouping matrix, $c_{p,i}^{SSS}$ represents an $i^{th}$ element of the candidate allocation vector, p is an index of the candidate solution, and i and n are indices of elements of the binary grouping matrix and the candidate allocation vector.

* * * * *